United States Patent [19]

Uyama

[11] Patent Number: 5,626,069
[45] Date of Patent: May 6, 1997

[54] VALVE PLUNGER RETAINING STRUCTURE IN A BOOSTER DEVICE

[75] Inventor: Shintaro Uyama, Saitama, Japan

[73] Assignee: Jidosha Kiki Co., Ltd., Tokyo, Japan

[21] Appl. No.: 563,457

[22] Filed: Nov. 28, 1995

[30] Foreign Application Priority Data

Dec. 28, 1994 [JP] Japan .................................. 6-339746

[51] Int. Cl.$^6$ ........................................................ F15B 9/10
[52] U.S. Cl. ........................................ 91/369.3; 91/376 R
[58] Field of Search ............................... 91/369.1, 369.2, 91/369.3, 376 R

[56] References Cited

U.S. PATENT DOCUMENTS

| | | | |
|---|---|---|---|
| 4,598,624 | 7/1986 | Wagner | 91/369.3 |
| 4,951,550 | 8/1990 | Ohki et al. | 91/369.3 |
| 4,953,446 | 9/1990 | Fecher et al. | 91/369.3 |
| 5,121,674 | 6/1992 | Uyama | 91/396.3 |
| 5,257,572 | 11/1993 | Jakobi et al. | 91/376 R |

FOREIGN PATENT DOCUMENTS 2146399  4/1985  United Kingdom .

Primary Examiner—Hoang Nguyen
Attorney, Agent, or Firm—Sughrue, Mion, Zinn, Macpeak & Seas

[57] ABSTRACT

A key member has an engaging portion, which is engaged with an annular groove formed in a valve plunger to prevent the valve plunger from coming off from a valve body. On the rear side of the key member, the valve body has a guide portion which is adapted to slidably guide the valve plunger. Axial passages are formed around the guide portion which form a variable pressure passage together with a radial passage. The key member is inserted in the radial passage in such a manner that its rear end face abuts against the end face of the guide portion. The distance between the engaging region of the key member and the valve plunger and the abutting portion of the key member and the valve body is decreased, so that the bending moment applied to the key member is decreased. This feature makes it possible to decrease the thickness of the key member and accordingly the weight of the latter.

4 Claims, 2 Drawing Sheets

VALVE PLUNGER RETAINING STRUCTURE IN A BOOSTER DEVICE

BACKGROUND OF THE INVENTION

This invention relates to a booster device employed, for instance, for a brake system in a motor vehicle, and more particularly to the structure in a booster device of this type which includes a key member to prevent a valve plunger from coming off from a valve body (hereinafter referred to as "a valve plunger retaining structure", when applicable).

In general, a booster device comprises: a power piston which is slidably arranged in a shell; a constant pressure chamber formed on the front side of the power piston, and a variable pressure chamber formed on the rear side of the power piston; a valve body provided in the central axial region of the power piston; a valve mechanism provided in the valve body; a variable pressure passage formed in the valve body through which the valve mechanism is communicated with the variable pressure chamber; an input shaft which operates in association with a valve plunger forming the valve mechanism, to switch flow paths in the valve mechanism; and a key member engaged with the valve plunger, to prevent the valve plunger from coming off the valve body.

The following structure for the booster device is also known in the art: In general, the variable pressure passage includes an axial passage which is extended from the valve mechanism along the axis of the valve body towards the front end of the booster device, and a radial passage which is extended radially from the front ends of the axial passage, and the key member is inserted into the radial passage to engage with the valve plunger. In this case, the radial passage is used as a hole into which the key member is inserted.

With the booster device, it is necessary to design the key member as follows: That is, both end faces of the key member are abutted against the valve body, so that the key member may not be axially moved; or the key member is axially movable a certain distance. However, in the case where the radial passage is used as the key-member inserting hole, the aforementioned axial passage is formed between the outer cylindrical surface of the rear part of the valve plunger and the inner cylindrical surface of the valve body, and the axial passage is communicated with the radial passage in which the key member is inserted. Hence, the abutment of the valve body against the rear end face of the key member occurs radially outside the axial passage.

On the other hand, the valve plunger is provided along the central axis of the axial passage in such a manner that it is axially movable. Hence, the region where the key member engages with the valve plunger is located on the axis central portion of the axial passage (hereinafter referred to as "an engaging region", when applicable). Therefore, the distance between the engaging region and the region where the key member abuts against the valve body (hereinafter referred to as "an abutting region", when applicable), is unavoidably relatively large. Hence, if, when the brake pedal is released to retract the valve plunger, the latter collides with the key member, a great bending moment is applied to the key member, so that the latter may be bent with high probability. This difficulty may be overcome by increasing the rigidity of the key member. However, the method gives rise to another difficulty that the key member is increased in thickness and accordingly in weight.

SUMMARY OF THE INVENTION

In view of the foregoing, an object of the invention is to provide a valve plunger retaining structure for a booster device in which the distance between the engaging region of the key member and the valve plunger and the abutting region of the key member and the valve body is made relatively small so that the key member is decreased in thickness and accordingly in weight.

In order to achieve the foregoing object of the invention, the above-described conventional booster device is improved as follows: A portion of the valve body which is on the rear side of the key member is formed into a guide portion which slidably guides the valve plunger; the variable pressure passage includes an axial passage formed around the guide portion so as to be extended along the axis of the valve body, and a radial passage extended from the front ends of the axial passage radially of the valve body; the key member is inserted into the radial passage to engage with the valve plunger; and the end face of the guide portion is protruded forwardly relative to the rear wall surface of the radial passage.

In the above-described booster device, the engaging region of the key member and the valve plunger corresponds to the axis of the axial passage. On the other hand, the guide portion of the valve body is located just outside the inner cylindrical surface which slidably guides the rear side portion of the key member. Accordingly, the abutting region of the key member and the guide portion of the valve body also corresponds to the axis of the axial passage.

Hence, the distance between the engaging region of the key member and the valve plunger and the abutting portion of the key member and the valve body can be made considerably short. Accordingly, the bending moment applied to the key member can be decreased. This feature eliminates the difficulty that the key member is bent by the bending moment, and makes it possible to decrease the thickness and weight of the key member when compared with the key member in the conventional booster device.

DETAILED DESCRIPTION OF THE PREFERRED EMBODIMENT

A preferred embodiment of this invention will be described with reference to the accompanying drawings.

Figure 1:
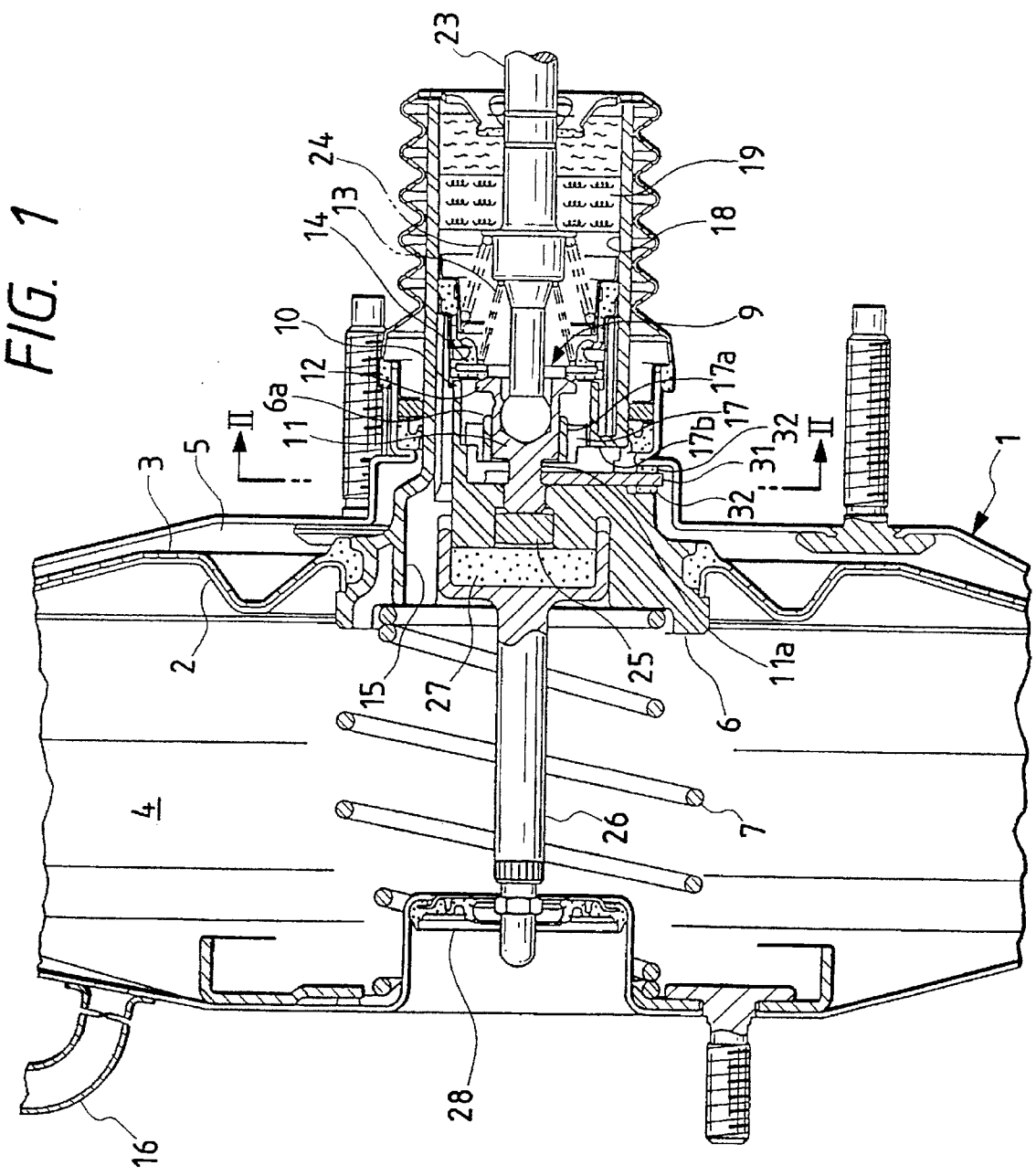
FIG. 1 is a sectional view showing a brake booster device, which constitutes a preferred embodiment of the invention.

As shown in FIG. 1, a brake booster device has a shell 1, in which a power piston 2 is slidably provided, and a diaphragm 3 is laid over the back of the power piston 2. The power piston 2 and the diaphragm 3 divide the inside of the shell 1 into a front chamber, namely, a constant pressure chamber 4, and a rear chamber, namely, a variable pressure chamber 5. A valve body 6 is fitted in the central axial hole of the power piston 2 in such a manner that the former 6 is integral with the latter 2. The power piston 2 and the valve body 6 are normally held at a non-operative position by a return spring 7 as shown in FIG. 1.

A valve mechanism 9 for switching flow paths is provided inside the valve body 6. The valve mechanism 9 comprise a first valve seat 10 formed on the valve body 6; a second valve seat 12 formed on a valve plunger 11; and a valve unit 14 which is seated on the first and second valve seats 10 and 12 from behind the power piston 2 (i.e., from the right-handled side in FIG. 1) by the elastic force of a spring 13. The space outside the seating region of the first valve seat 10 and the valve unit 14 is communicated with the constant pressure chamber 4 through a constant pressure passage 15 formed in the valve body 6. The constant pressure chamber 4 is communicated with a negative pressure source such as the intake manifold through a negative pressure lead-in pipe 16 connected to the shell 1.

The space between the seating region of the first valve seat 10 and the valve unit 14 and the seating region of the second valve seat 12 and the valve unit 14, is communicated with the variable pressure chamber 5 through a variable pressure passage 17 formed in the valve body 6. The space inside the seating region of the second valve seat 12 and the valve unit 14 is communicated with the outside air through a pressure passage 18 and a filter 19 fitted in the latter 18.

The valve plunger 11 forming the above-described valve mechanism 19 is coupled to an input shaft 23 which is connected to the brake pedal (not shown). The input shaft 23 is urged backwardly by a spring 24 which is greater in elastic force than the aforementioned spring 13. The front end face of a plate 25 provided on the front end of the valve plunger 11 is confronted with a reaction disk 27 which is set in a recess formed in the base end portion of an output shaft 26. The output shaft 26 is extended out of the shell 1 through a seal member 28, and is coupled to the piston of the master cylinder (not shown).

Figure 2:
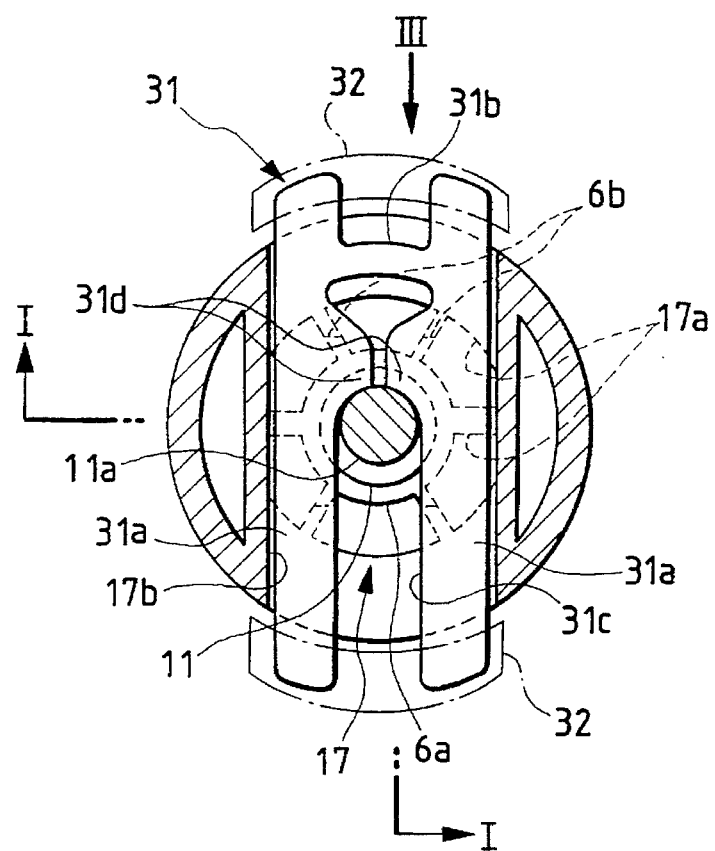
FIG. 2 is a sectional view taken along line II—II of FIG. 1, showing a key member and its relevant components in the brake booster device.
Figure 3:
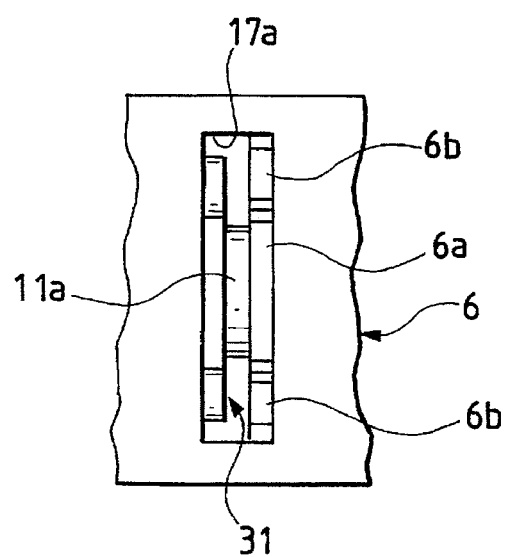
FIG. 3 is a schematic plane view as viewed in the direction of the arrow III of FIG. 2.

The variable pressure passage 17 includes axial passages 17a which are formed in the front portion of the valve body 6 in such a manner that they are extended along the axis of the valve body 6 from the valve mechanism 9; and a radial passage 17b which is communicated with the front ends of the axial passages 17a and extended radially of the valve body 6. As shown in FIG. 2, a key member 31 is inserted into the radial passage way 17b (FIG. 2 being a sectional diagram taken along line II—II of FIG. 1).

The key member 31 includes: a pair of leg portions 31a which are extended along both sides of the radial passage 17b; a bridge portion 31b through which the leg portions are connected to each other; and a pair of engaging portions 31d which are protruded from the leg portions 31a into a slit 31c which is defined by the leg portions 31a. More specifically, the engaging portions 31d are located closer to the bridge portion 31b than the middles of the leg portions 31a. The engaging portions 31d are engaged with an annular groove 11a (cf. FIG. 1) formed in the valve plunger 11, thereby to prevent the valve plunger 11 from coming off the valve body 6.

As shown in FIG. 1, the key member 31 is displaceable axially of the valve body 6. The front end face of the key member 31 abuts against the wall of the valve body 6 which defines the front ends of the axial passages 17a. On the other hand, the rear end face of the key member 31 abuts against the end face of a guide portion 6a which is formed as a portion of the valve body 6 to slidably guide the rear part of the valve plunger 11.

That is, the front part of the valve plunger 11 which is located in front of the annular groove 11a, and the rear part located behind the annular groove 11a are slidably supported by the valve body 6. The portion of the valve body 6 which slidably supports the rear part of the valve plunger 11 is the aforementioned guide portion 6a. The above-described plurality of axial passages 17a, as shown in FIG. 2, are formed in the valve body 6 around the guide portion 6a of the valve body 6 and along the inner cylindrical surface of the latter 6. The outer cylindrical portion of the valve body 6 and the inner cylindrical portion of the latter 6, namely, the guide portion 6a are connected through a plurality of ribs 6 which are radially extended defining the plurality of axial passages 17a. The end face of the guide portion 6a is protruded forwardly relative to the rear wall surface defining the radial passage 17, so that, as was described above, the rear end face of the key member 31 is abutted against the end face of the guide portion 6a.

Both end portions of the key member 31 are protruded out of the outer cylindrical wall of the valve body 6, and are covered with elastic members 32 of rubber or the like. The elastic members 32 prevents the key member 31 from coming off the valve body 6, and further prevents the key member 31 from producing noises when it abuts against the inner surface of the shell 1.

In the case where, in the brake booster device thus organized, the power piston is at the non-operative position as shown in FIG. 1, the key member 31 is abutted against the inner surface of the shell 1; that is, the key member 31 is prevented from moving backwardly. On the other hand, the wall of the valve body 6 which defines the end portions of the axial passages 17a is abutted against the front end face of the key member 31; that is, the valve body 6 is also prevented from moving backwardly. Under this condition, the key member 31, and the valve plunger 11 engaged with the latter 31 through the annular groove 11a are held at forward positions with respect to the valve body 6. Hence, the valve unit 14 seated on the second valve seat 12 of the valve plunger 11 is located in the vicinity of the first valve seat 10, and therefore immediately when the input shaft 23 and the valve plunger 11 are moved forwardly, the above-described valve mechanism 9 can perform a fluid circuit switching operation.

When, under this condition, the brake pedal (not shown) is operated to move the input shaft 23 and the valve plunger 11 to the left in FIG. 1, the valve unit 14 becomes seated on the first valve seat 10 of the valve body 6 to isolate the variable pressure chamber 5 and the constant pressure chamber 4 from each other, while the second valve seat 12 of the valve plunger 11 is moved away from the valve unit 14 to communicate the variable pressure chamber 5 with the outside air. As a result, the outside air is supplied into the variable pressure chamber 5. Hence, similarly as in the case of the conventional brake booster device, the difference in pressure between those two chambers moves the power piston 2 forwardly against the elastic force of the return spring 7; that is, a braking action is effected.

When, under this condition, the brake pedal is released, the second valve seat 12 of the valve plunger 11 is engaged with the valve unit 14 to isolate the variable pressure chamber from the outside air, while the valve unit 14 is disengaged from the first valve seat 10 to communicate the variable pressure chamber 5 with the constant pressure chamber. As a result, the power piston 2 is returned to the initial position (or the non-operative position).

When the power piston 2 is returned to the non-operative position by the return spring 7, the input shaft 23 is urged backwardly by the spring 24, and accordingly the valve plunger 11 and the key member 31 are also moved backwardly. When the rear end face of the key member 31 abuts against the end face of the guide portion 6a, the backward movement of the key member 31 to the valve body 6 is stopped, and accordingly the backward movement of the valve plunger 11 is also stopped.

Under this condition (that the rear end face of the key member 31 abuts against the end face of the guide portion 6a), the valve unit 14 is shifted backwardly as much as the key member 31 is axially movable with respect to the valve body 6 while the power piston is at the non-operative position and the front end face of the key member 31 is abutted against the wall surface of the valve body 6. That is, the valve unit 14 is retracted from the first valve seat 10 of the valve body 6 as much as the key member 31 is axially movable with respect to the valve body 6, so that a sufficiently large flow path is provided between the first valve seat 10 and the valve unit 14.

When the power piston 2 is moved backwardly in the above-described manner, the key member 31 is abutted against the inner wall surface of the shell 1. Accordingly, the backward movement of the valve plunger 11 operating in association with the key member 31 is stopped, whereas the backward movement of the power piston 2 and the valve body 6 is continued, so the first valve seat 10 of the valve body 6 approaches the valve unit 14. When the gap between the first valve seat 10 and the valve unit 14 is substantially zeroed, the valve body 6 is abutted against the key member 31, thus being stopped. Hence, immediately when the input shaft 23 is moved forwardly again, in the valve mechanism 9 the fluid circuit switching operation is carried out.

As was described above, when the power piston 2 is returned from the forward position to the non-operative position by the return spring 7, the rear end face of the key member 31 is abutted against the end face of the guide portion 6a. In this case, depending on the operation of the brake pedal, the key member 31 may collide with the end face of the guide portion 6a relatively hard.

In this case, with the brake booster device of the invention, the central portion of the key member 31 collides with the guide portion 6. The central portion is adjacent to the outer periphery of the engaging region where the key member 31 is engaged with the annular groove 11a of the valve plunger 11. Hence, when the key member 31 collides with the valve portion 6a in the above-described manner, no great bending moment acts on the key member 31; that is, the difficulty is substantially eliminated that the key member 31 is bent by the bending moment. This feature makes it possible to reduce the thickness and weight of the key member 31.

In the above-described embodiment, the key member 31 is axially movable a certain distance; however, the invention is not limited thereto or thereby. That is, the technical concept of the invention is applicable to a booster device in which the key member is fixedly secured to the valve body.

As was described above, in the brake booster device of the invention, the bending moment applied to the key member is small; that is, the difficulty is substantially eliminated that the key member is bent by the bending moment. This feature provides an effect that the key member can be decreased in thickness and accordingly in weight.

What is claimed is:

1. In a booster device comprising:

a power piston arranged in a shell and slidable along an axis;

a constant pressure chamber formed on a front side of said power piston, and a variable pressure chamber formed on a rear side of said power piston;

a valve body provided along said axis;

a valve mechanism provided in said valve body and having a valve plunger;

a variable pressure passage formed in said valve body through which said valve mechanism is communicated with said variable pressure chamber;

an input shaft which operates in association with said valve plunger to switch flow paths in said valve mechanism; and a key member for engagement with said valve plunger to prevent said valve plunger from being removed from said valve body, a valve plunger retaining structure comprising an improvement wherein:

a portion of said valve body which is located on a rear side of said key member is formed into a guide portion having an inner cylindrical surface on which said valve plunger is slidably supported;

said variable pressure passage is formed by an axial passage provided along said axis and located radially outwardly with respect to said inner cylindrical surface, and a radial passage extended radially outwardly from a front end of said axial passage;

said key member is inserted into said radial passage and engaged with said valve plunger; and an end face of said guide portion is protruded forwardly relative to a wall surface of said valve body, said wall surface defining said radial passage and located behind said key member, wherein when said booster device is returned from an operative state to a non-operative state, said key member is abutted against said end face of said guide portion with a gap between said key member and said wall surface of said valve body.

2. A valve plunger retaining structure according to claim 1, wherein said valve plunger has a first cylindrical portion engaged with said key member and a second cylindrical portion adjacent to said first cylindrical portion and slidably supported by said inner cylindrical surface of said guide portion.

3. A valve plunger retaining structure according to claim 1, said guide portion is contactable with said key member at a location radially inwardly relative to said axial passage.

4. A valve plunger retaining structure according to claim 1, wherein said valve body having a plurality of radially extending ribs for dividing said axial passage into a plurality of angular sections.

* * * * *